US010773982B2

(12) United States Patent
Frankel et al.

(10) Patent No.: US 10,773,982 B2
(45) Date of Patent: Sep. 15, 2020

(54) DIFFUSER ASSEMBLY

(71) Applicants: Thomas E. Frankel, Poughkeepsie, NY (US); Seoungil Kang, Poughkeepsie, NY (US); Todd D. Ritter, Poughkeepsie, NY (US)

(72) Inventors: Thomas E. Frankel, Poughkeepsie, NY (US); Seoungil Kang, Poughkeepsie, NY (US); Todd D. Ritter, Poughkeepsie, NY (US)

( * ) Notice: Subject to any disclaimer, the term of this patent is extended or adjusted under 35 U.S.C. 154(b) by 253 days.

(21) Appl. No.: 15/674,167

(22) Filed: Aug. 10, 2017

(65) Prior Publication Data

US 2019/0047887 A1 Feb. 14, 2019

(51) Int. Cl.
*B01F 3/04* (2006.01)
*C02F 3/20* (2006.01)

(52) U.S. Cl.
CPC .......... *C02F 3/201* (2013.01); *B01F 3/04269* (2013.01); *B01F 2003/04177* (2013.01); *B01F 2003/04276* (2013.01); *B01F 2003/04312* (2013.01); *B01F 2003/04361* (2013.01); *B01F 2215/0052* (2013.01)

(58) Field of Classification Search
CPC ........ B01F 3/04269; B01F 2003/04177; B01F 2003/04276; B01F 2003/04312; B01F 2003/04361; B01F 2215/0052; C02F 3/201
USPC .......................................... 261/122.1, 122.2
See application file for complete search history.

(56) References Cited

U.S. PATENT DOCUMENTS 5,098,581 A * 3/1992 Roediger .............. B01F 3/0412 210/101
7,311,299 B2 * 12/2007 Sasajima ................ C02F 3/201 261/122.1
8,061,689 B2 * 11/2011 Tharp .................. B01F 3/0412 261/122.1
2004/0124550 A1 * 7/2004 Casper ................. B01F 3/0412 261/122.1
2011/0057334 A1 * 3/2011 Doppler .............. B01F 3/04269 261/64.1
2011/0248414 A1 * 10/2011 Reilly ................ B01F 3/04269 261/122.1
2017/0210652 A1 7/2017 Frankel et al.

FOREIGN PATENT DOCUMENTS

WO 2012063995 A1 5/2012

* cited by examiner

*Primary Examiner* — Charles S Bushey
(74) *Attorney, Agent, or Firm* — Law Offices of Michael L. Wise, LLC

(57) ABSTRACT

A diffuser assembly includes a flexible diffuser membrane and a diffuser body. The flexible diffuser membrane defines a perimeter edge bead along four edges. The diffuser body defines an underlying body portion underlying the flexible diffuser membrane, and a perimeter edge frame covering a covered portion of the perimeter edge bead. The edge frame defines an inside surface that conforms to an outside shape of the covered portion of the perimeter edge bead. The perimeter edge frame is integral to the underlying body portion.

17 Claims, 12 Drawing Sheets

130
175
175
170
145
150
185
135

120
Air
In
105
110
100
12
Air
Out
100
115

125
130
100
4
140
175
160
4
155
5
170
5

125
100
150
170
145
160
155

DIFFUSER ASSEMBLY

FIELD OF THE INVENTION

The present invention relates generally to wastewater treatment, and, more particularly, to diffuser assemblies for use in wastewater treatment.

BACKGROUND OF THE INVENTION

Tube diffusers are conventionally used to support aerobic biological processes in wastewater treatment plants. A tube diffuser typically comprises a cylindrical flexible diffuser membrane that covers a rigid cylindrical support tube. Supplying pressurized air to the tube diffuser while the tube diffuser is immersed in wastewater has the effect of expanding the flexible diffuser membrane away from the support tube and causing the air to escape into the wastewater through a multiplicity of perforations in the flexible diffuser membrane. The effect is a plume of small bubbles that act both to oxygenate the biological processes occurring in the wastewater treatment tank and to provide a mixing function. Wastewater treatment in such a manner is described in, as just one example, F. L. Burton, Wastewater Engineering (McGraw-Hill College, 2002), which is hereby incorporated by reference herein.

Despite their popularity, the installation and servicing of tube diffusers remain relatively labor intensive tasks, and generally require the use of skilled labor. If not installed correctly, a tube diffuser may leak causing a non-uniform distribution of bubbles. Even worse, a leak may allow wastewater to enter (i.e., flood) the submerged air piping of the wastewater treatment system. If either one of these issues is present, a wastewater treatment tank may need to be drained to re-access and repair the defects. Such repairs may be time-consuming, expensive, and will clearly take the wastewater treatment tank offline.

There is as a result a need for alternative diffuser assemblies that address some of the above-identified deficiencies.

SUMMARY OF THE INVENTION

Embodiments of the present invention address the above-identified needs by providing diffuser assemblies with flexible diffuser membranes that are captured by diffuser bodies utilizing integral perimeter edge frames that cannot be separated from the remainders of the diffuser bodies. Such diffuser assemblies may provide a disposable option with many advantages over conventional technologies, such as improved ease of installation and lower chances of leaks.

Aspects of the invention are directed to a diffuser assembly comprising a flexible diffuser membrane and a diffuser body. The flexible diffuser membrane defines a perimeter edge bead along four edges. The diffuser body defines an underlying body portion underlying the flexible diffuser membrane, and a perimeter edge frame covering a covered portion of the perimeter edge bead. The edge frame defines an inside surface that conforms to an outside shape of the covered portion of the perimeter edge bead. The perimeter edge frame is integral to the underlying body portion.

Additional aspects of the invention are directed to a wastewater treatment system comprising a diffuser assembly meeting the limitations of the paragraph immediately above. The diffuser assembly is in gaseous communication with an inside of a gas distribution pipe. The gas distribution pipe is supported over the bottom of a wastewater treatment tank.

Even additional aspects of the invention are directed to a method of manufacturing a diffuser assembly. A flexible diffuser membrane is received that defines a perimeter edge bead along four edges. A diffuser body is formed at least in part by injection molding, with the diffuser body defining an underlying body portion underlying the flexible diffuser membrane, and a perimeter edge frame covering a covered portion of the perimeter edge bead. The perimeter edge frame defines an inside surface that conforms to an outside shape of the covered portion of the perimeter edge bead. The perimeter edge frame is integral to the underlying body portion.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, an element is "not substantially compressed" by something else if the element's volume is not reduced by compression by more than ten percent. The term "directly" means without any intervening elements. A feature defined by an element is "integral" to that element if the feature cannot be separated from the remainder of that element without cutting, breaking, melting, or otherwise damaging the element. Finally, the "longitudinal axis" of an object that is rectangular in elevational view is an axis parallel to the longer edge of the rectangle.

Figure 1:
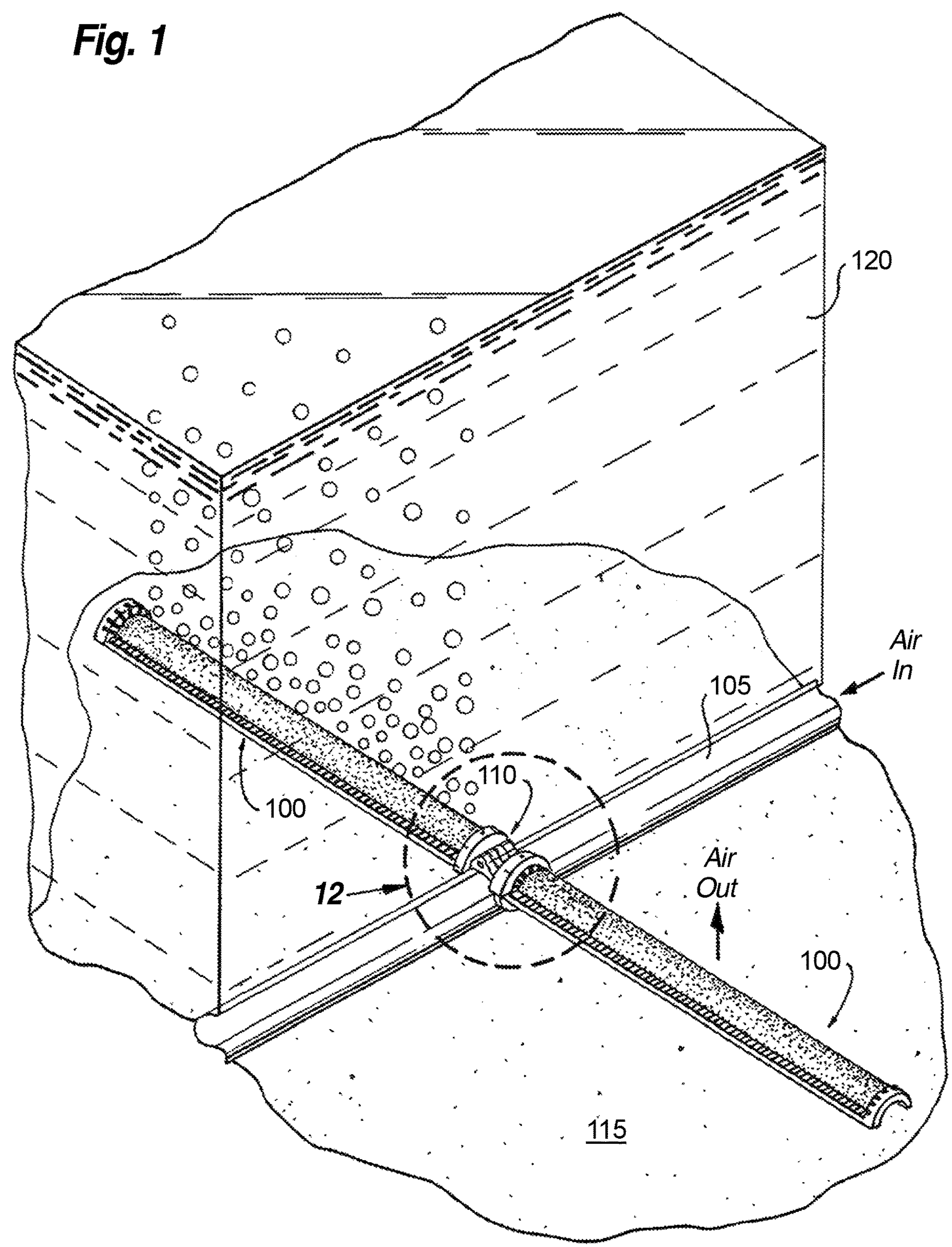
FIG. 1 shows a partially broken perspective view of diffuser assemblies in accordance with an illustrative embodiment of the invention in combination with a gas supply pipe at the bottom of a wastewater treatment tank.

FIG. 1 shows a partially broken perspective view of two diffuser assemblies 100 in accordance with an illustrative embodiment of the invention. The two diffuser assemblies 100 are mounted to a gas distribution pipe 105 via a specialized connection saddle 110. The gas distribution pipe 105 is suspended just above the floor of a wastewater treatment tank 115 full of wastewater 120, causing all of the elements to be submerged in the wastewater 120. Pressurized air supplied to the diffuser assemblies 100 via the gas distribution pipe 105 is released into the wastewater 120 in order to oxygenate the biological processes occurring in the wastewater treatment tank 115, as well as to provide a mixing function.

Figure 2:
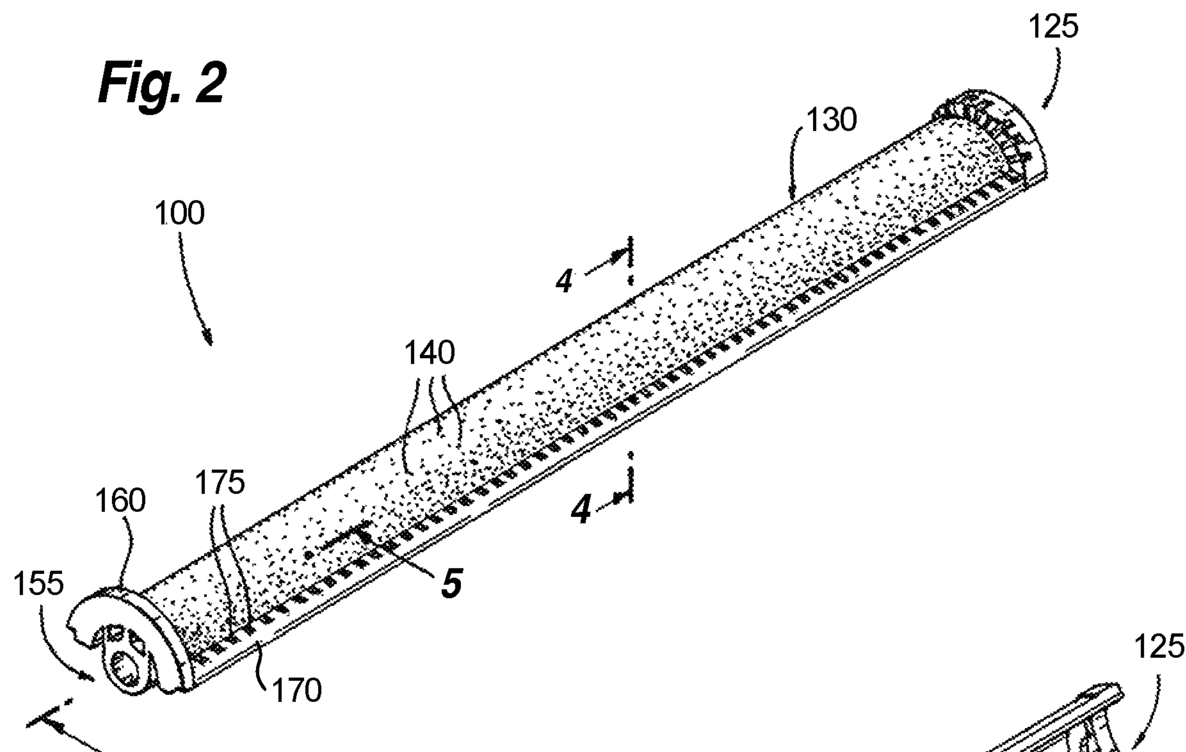
FIGS. 2 and 3 show top and bottom perspective views, respectively, of a representative FIG. 1 diffuser assembly.
Figure 3:
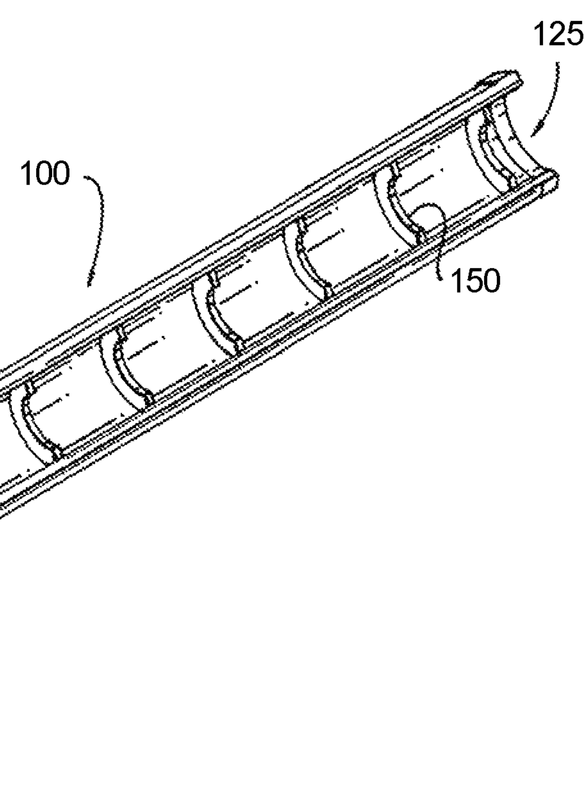
Figure 4:
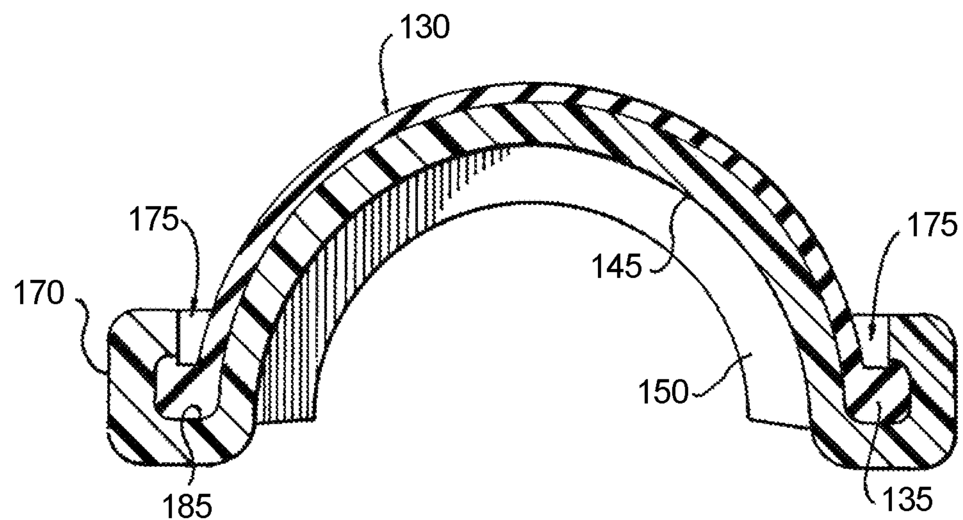
FIGS. 4 and 5 shows sectional views of the representative FIG. 1 diffuser assembly.
Figure 5:
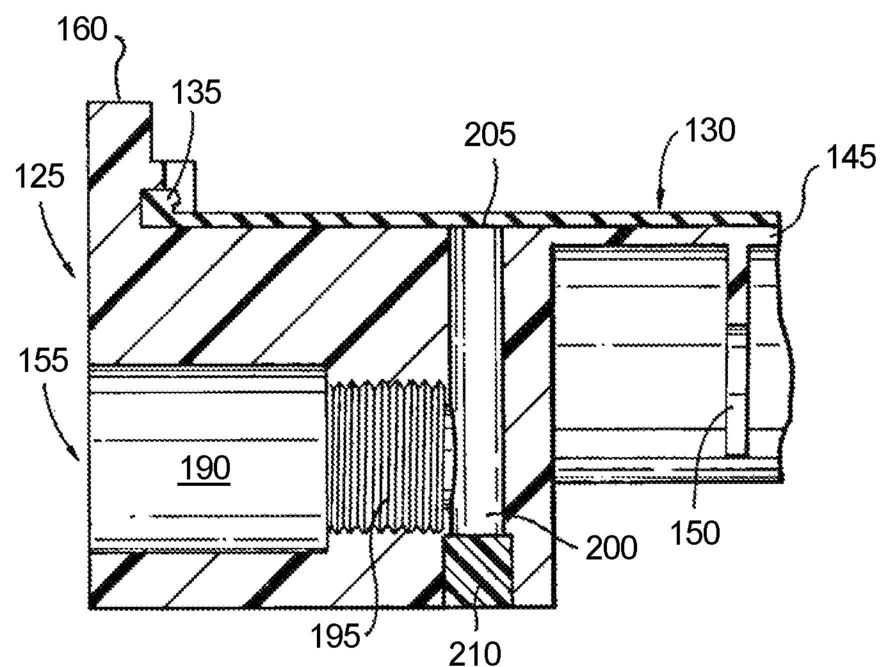

Details of a representative one of the diffuser assemblies 100 are provided by FIGS. 2-5. FIGS. 2 and 3 show top and bottom perspective views, respectively, while FIGS. 4 and 5 show sectional views along the cleave planes indicated in FIG. 2. The representative diffuser assembly 100 comprises a diffuser body 125 and a flexible diffuser membrane 130. Notably, the diffuser body 125 and the flexible diffuser membrane 130 do not describe complete cylinders in the manner of a conventional tube diffuser. Rather, the present diffuser body 125 and the overlying flexible diffuser membrane 130 describe half of a cylinder. That is, the cross-sections of the diffuser body 125 and the overlying flexible diffuser membrane 130 in a cleave plane perpendicular to the diffuser membrane's longitudinal axis (FIG. 4) approximate 180-degree arcs with curvatures transverse to the longitudinal axes of the diffuser body 125 and the flexible diffuser membrane 130.

Viewed top down in elevation (i.e., in plan view), the flexible diffuser membrane 130 is rectangular with four straight edges and defines a perimeter edge bead 135 running about these four edges. In the present illustrative embodiment, the perimeter edge bead 135 approximates a square in cross-section with rounded corners (FIG. 4). A plurality of perforations 140 penetrate the flexible diffuser membrane 130 to allow air bubbles to escape into the surrounding wastewater 120.

The diffuser body 125 defines an arc-shaped underlying body portion 145 that underlies the flexible diffuser membrane 130. Transverse reinforcing members 150 underlie the arc-shaped underlying body portion 145 to add rigidity thereto. A receiving portion 155 and an arc-shaped tab 160 are found at a proximate end of the diffuser body 125. The diffuser body 125 further defines a perimeter edge frame 170 that runs about a perimeter of the diffuser body 125. The perimeter edge frame 170 is integral to the diffuser body 125, meaning that the perimeter edge frame 170 cannot be removed from the arc-shaped underlying body portion 145 and the remainder of the diffuser body 125 without cutting, breaking, melting, or otherwise damaging the diffuser body 125.

The perimeter edge frame 170 of the diffuser body 125 covers a portion of the perimeter edge bead 135 of the flexible diffuser membrane 130 (hereinafter the "covered portion of the perimeter edge bead 135") to retain the flexible diffuser membrane 130 to the diffuser body 125 and to create an airtight seal therebetween. In so doing, the perimeter edge frame 170 defines a plurality of slots 175 therein, each slot 175 exposing a respective outside surface portion of the perimeter edge bead 135. Internally, the perimeter edge frame 170 defines an inside surface 185 that conforms to an outside shape of the covered portion of the perimeter edge bead 135 without substantially compressing the perimeter edge bead 135 (FIG. 4).

The receiving portion 155 at the proximate end of the diffuser body 125 aids in coupling the flexible diffuser membrane 130 to its source of compressed air, and ultimately routing that air to a position between the flexible diffuser membrane 130 and the arc-shaped underlying body portion 145 that immediately underlies the flexible diffuser membrane 130. FIG. 5 provides details of the internal components of the diffuser body 125 in the vicinity of the receiving portion 155. Internally, the receiving portion 155 defines a hollow-cylindrical straight-walled sub-portion 190 that terminates in a hollow-cylindrical internally-threaded sub-portion 195. Past the hollow-cylindrical internally-threaded sub-portion 195, an internal vertical tube 200 is in gaseous communication with the hollow-cylindrical straight-walled sub-portion 190 and the hollow-cylindrical internally-threaded sub-portion 195. The internal vertical tube 200 terminates in an opening 205 in the diffuser body 125 that sits immediately below (i.e., underlies) a region of the flexible diffuser membrane 130. A plug 210 at the bottom of the internal vertical tube 200 stops air from being released from the bottom of the internal vertical tube 200. Pressurized air entering the internal vertical tube 200 through the receiving portion 155 is thereby forced into the region between the flexible diffuser membrane 130 and the arc-shaped underlying body portion 145. That air is ultimately released through the perforations 140 in the flexible diffuser membrane 130.

The flexible diffuser membrane 130 may comprise an elastomer such as, but not limited to, ethylene propylene diene monomer (EPDM). One or both sides of the flexible diffuser membrane 130 may be covered in a fluoroelastomer such as, for example, polytetrafluoroethylene (PTFE), or the flexible diffuser membrane 130 may be impregnated with fluorine. Both PTFE coatings and fluorine impregnation have been demonstrated to reduce the rate at which diffuser membranes are fouled. The diffuser body 125 may comprise a plastic such as but not limited to, for example, polypropylene, acrylonitrile butadiene styrene, polyvinyl chloride, and polyoxymethylene.

The integral nature of the diffuser body 125 and the flexible diffuser membrane 130 in the diffuser assembly 100 may be facilitated by injection molding the diffuser body 125 around the flexible diffuser membrane 130 utilizing several molding parts. This may be described as a form of "co-molding." General aspects of injection molding will already be familiar to one having ordinary skill in the relevant arts, and are also described in several readily accessible publications including, as just one example, D. V. Rosatto et al., Injection Molding Handbook (Springer Science & Business Media, 2012), which is hereby incorporated by reference herein.

Figure 6:
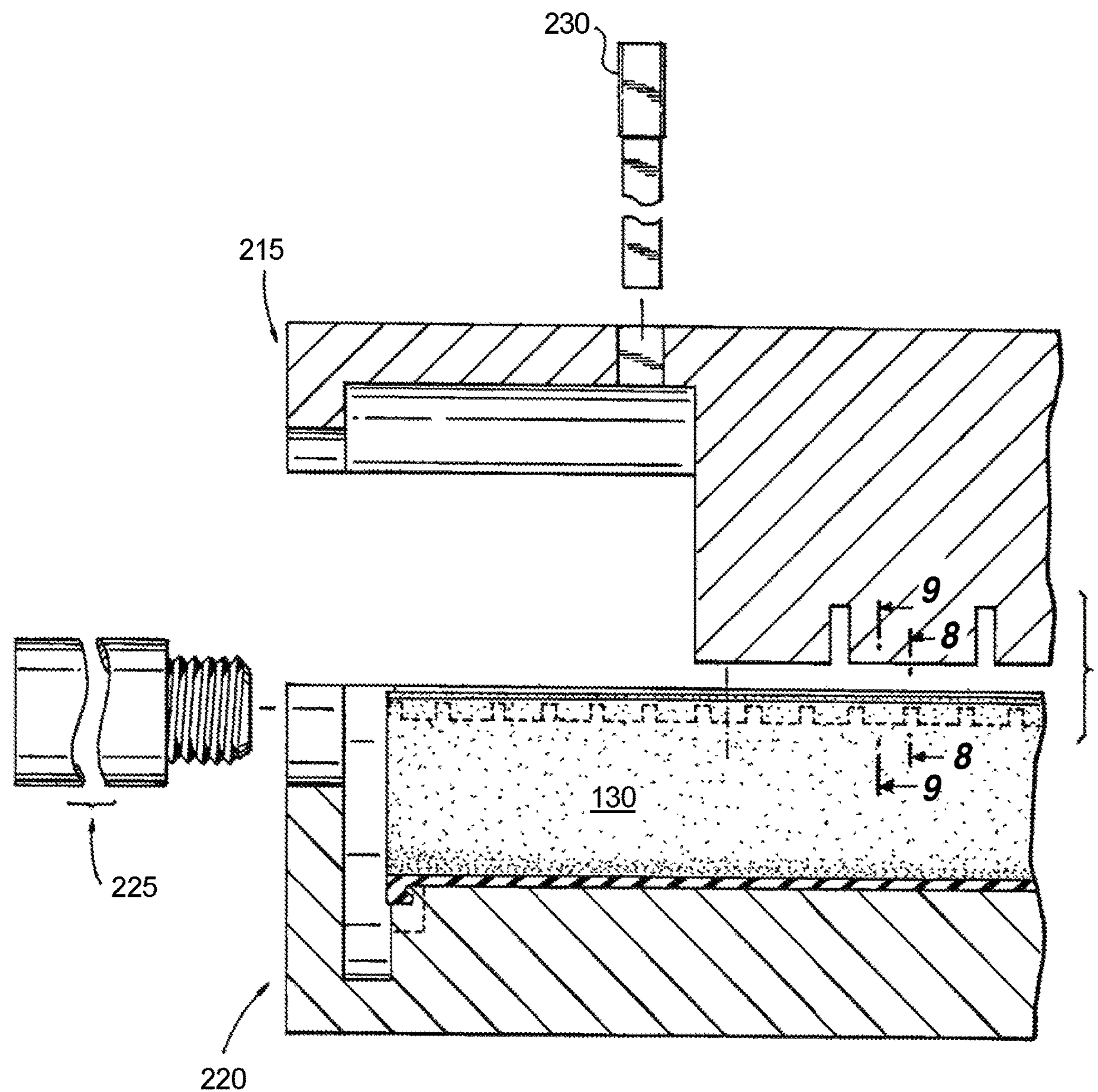
FIG. 6 shows an exploded sectional view of molding parts in association with a flexible diffuser membrane for the representative FIG. 1 diffuser assembly before thermoplastic injection.
Figure 7:
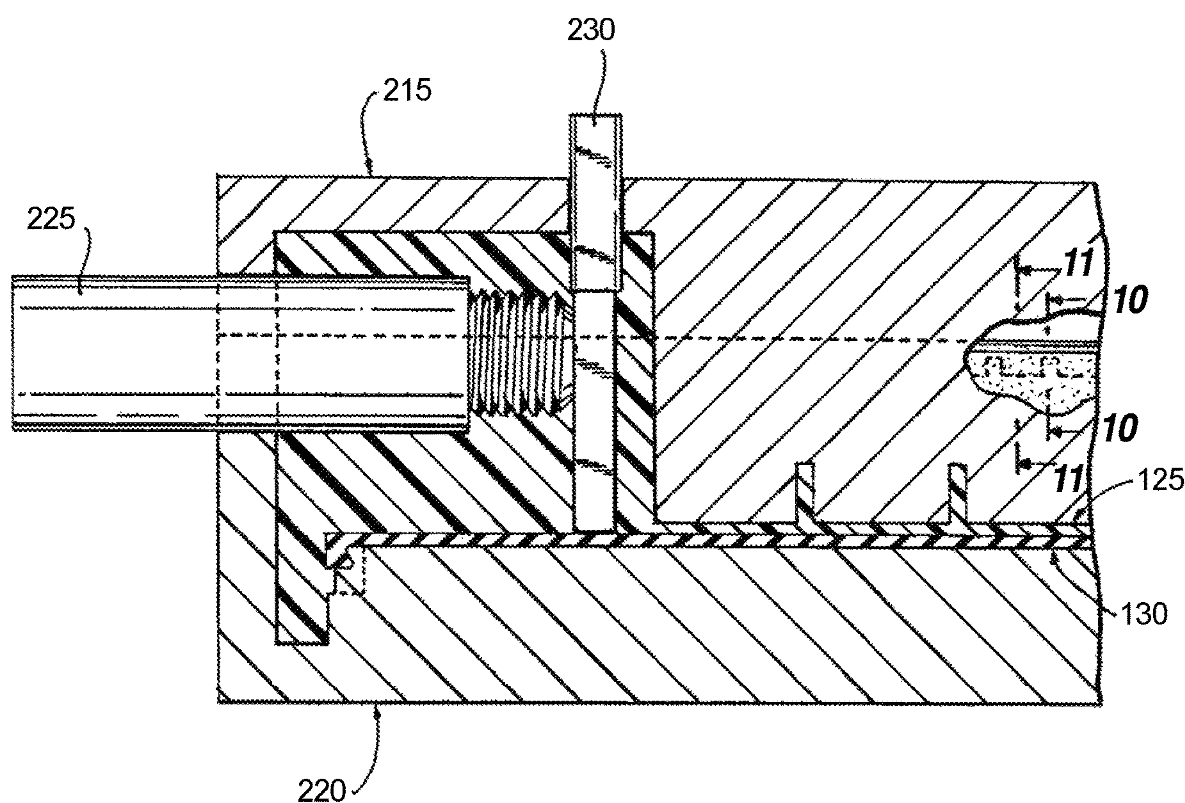
FIG. 7 shows a sectional view of molding parts in association with the flexible diffuser membrane for the representative FIG. 1 diffuser assembly after thermoplastic injection.

Several molding parts are arranged around the flexible diffuser membrane 130 prior to injecting molten thermoplastic. An exploded sectional view of the molding parts in relation to the flexible diffuser membrane 130 prior to thermoplastic injection is shown in FIG. 6, while a sectional view of the same molding parts arranged about the flexible diffuser membrane after thermoplastic injection (i.e., after formation of the diffuser body 125) is shown in FIG. 7. Similarly, FIGS. 8-11 show sectional views of molding parts in relation to the perimeter edge bead 135 of the flexible diffuser membrane 130, with FIGS. 8 and 9 being before thermoplastic injection, and FIGS. 10 and 11 being after. The molding parts include a top mold 215, a bottom mold 220, a receiving portion insert 225, and an internal vertical tube insert 230. In order to allow gravity to aid in the process, the injection molding set forth in FIGS. 6-11 is performed with the flexible diffuser membrane 130 upside-down (and ultimately the diffuser body 125 upside-down) in relation to its orientation in the previous figures. The receiving portion insert 225 defines the space that will ultimately become the receiving portion 155 of the diffuser assembly 100, while the internal vertical tube insert 230 defines the space that will ultimately become the internal vertical tube 200 and the volume occupied by the plug 210 in the diffuser assembly 100.

Figure 8:
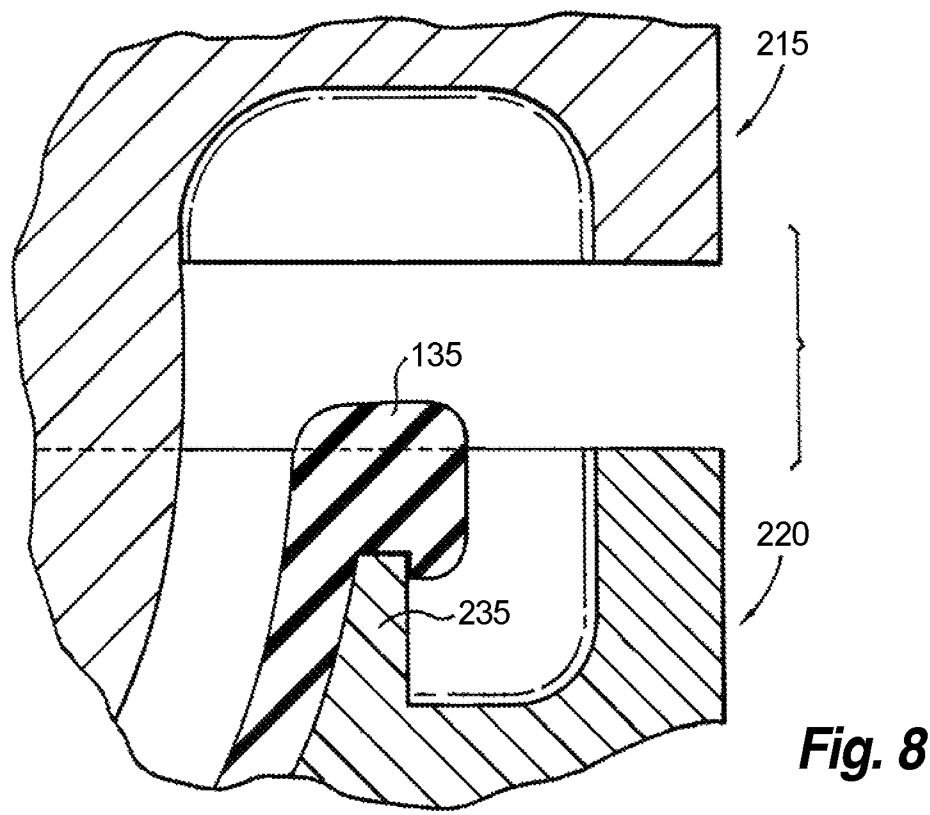
FIGS. 8 and 9 show sectional views of the molding parts in association with the flexible diffuser membrane in the vicinity of the flexible diffuser membrane's perimeter edge bead before thermoplastic injection.
Figure 9:
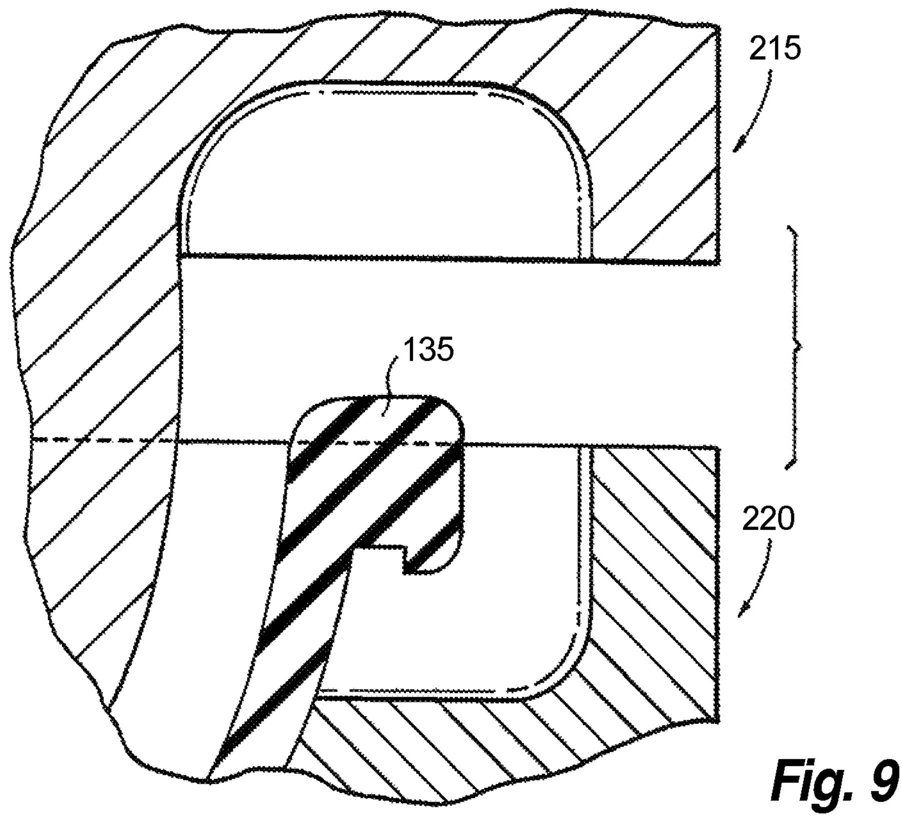
Figure 10:
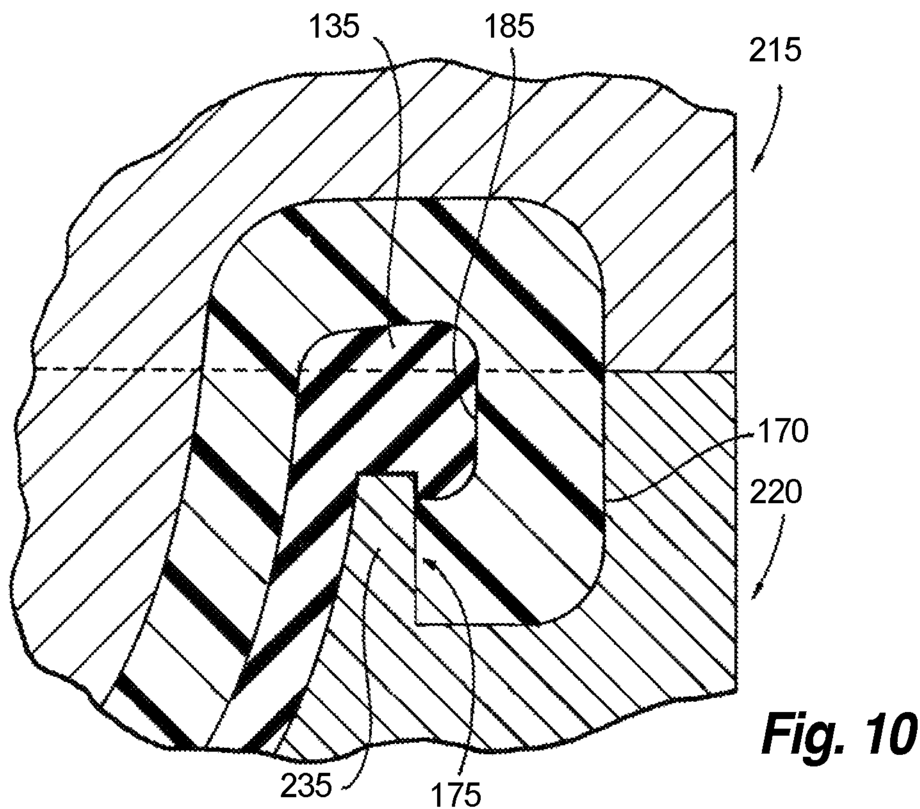
FIGS. 10 and 11 show sectional views of the molding parts in association with the flexible diffuser membrane in the vicinity of the flexible diffuser membrane's perimeter edge bead after thermoplastic injection.
Figure 11:
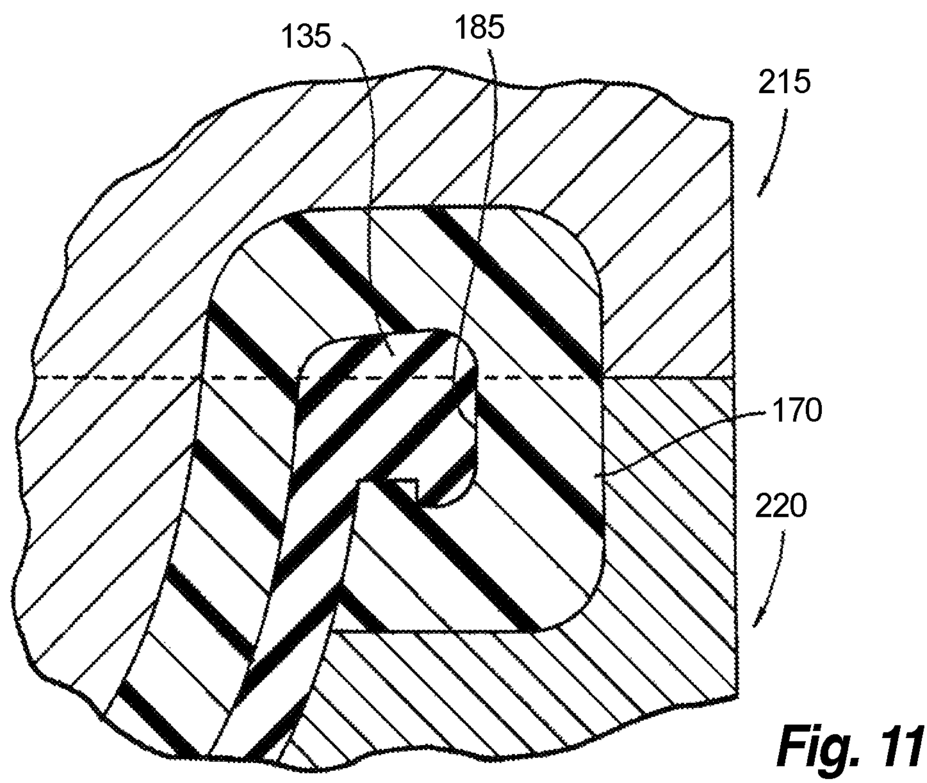

Prior and during injection molding, the flexible diffuser membrane 130 is supported upside-down along its perimeter edge bead 135 by a set of supporting teeth 235 defined by the bottom mold 220. During injection molding, molten thermoplastic directly contacts the covered portion of the perimeter edge bead 135. FIGS. 8 and 10 show a region where a supporting tooth 235 is present in the bottom mold 220, while FIGS. 9 and 11 show a region without a supporting tooth 235. From these views, it becomes clear that, where the supporting teeth 235 are present, one obtains the slots 175 in the perimeter edge frame 170 of the diffuser body 125 that are so apparent in FIGS. 1, 2, and 4, thereby explaining the source of these slots 175. Where no supporting teeth 235 are present, one finds the fully encompassing regions of the perimeter edge frame 170. Because the molten thermoplastic is able to flow directly against the perimeter edge bead 135 of the flexible diffuser membrane 130, one also finds that the perimeter edge frame 170 defines the inside surface 185 that conforms to an outside shape of the covered portion of the perimeter edge bead 135. The molten thermoplastic does not tend to compress the perimeter edge bead 135 to any great extent. The covered portion of the perimeter edge bead 135 consists of a majority of the perimeter edge bead 135.

If adhesion or fusing of the flexible diffuser membrane 130 to the diffuser body 125 is of concern during injection molding and cooling, a thin sheet may be disposed prior to molding between the diffuser membrane 130 and the volume that will ultimately become the arc-shaped underlying body portion 145. The thin sheet may comprise a plastic; in a preferred embodiment, the thin sheet is formed of the same plastic as the diffuser body.

Figure 12:
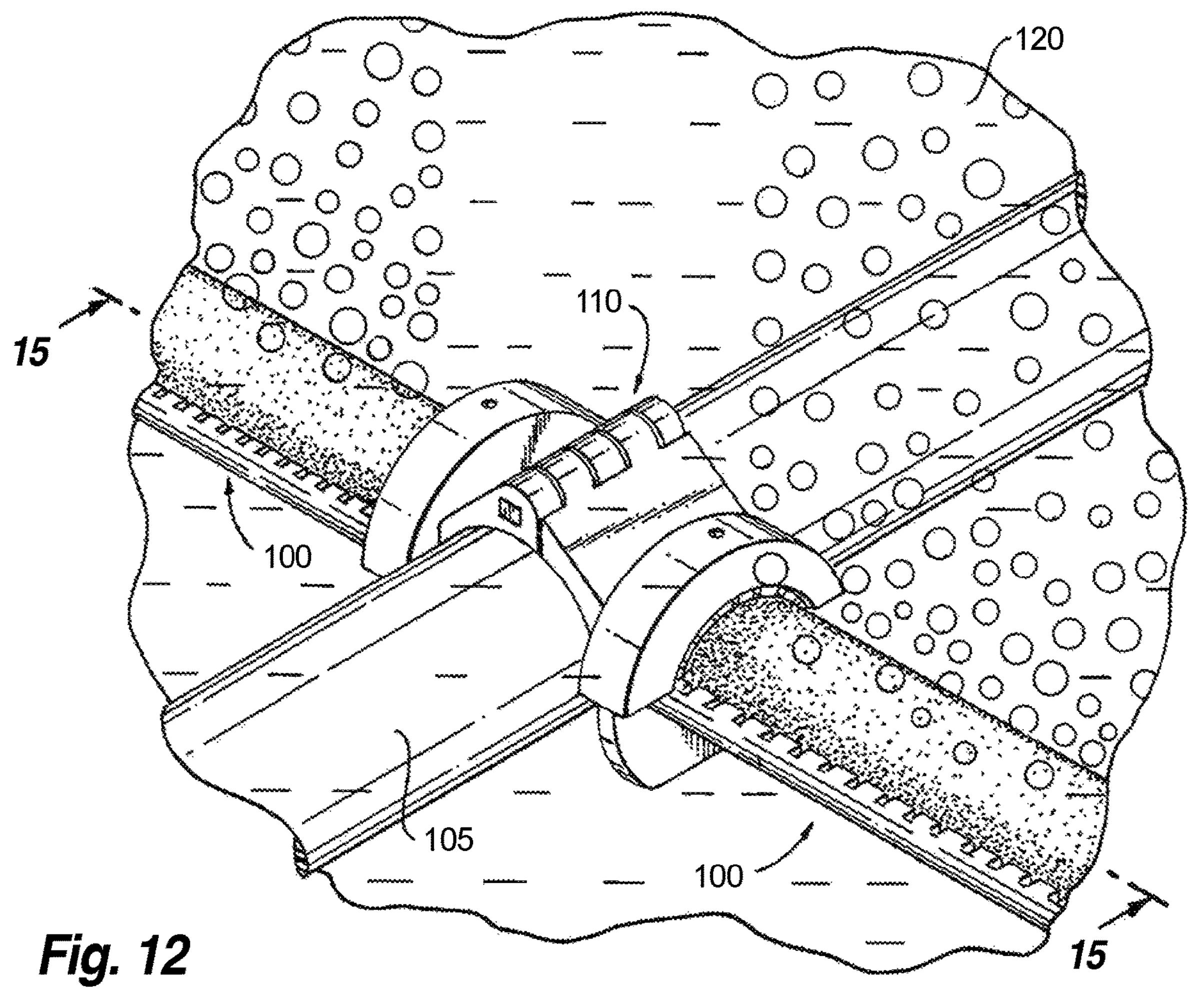
FIG. 12 shows a perspective view of the FIG. 1 diffuser assemblies connected to a gas distribution pipe via a connection saddle.
Figure 13:
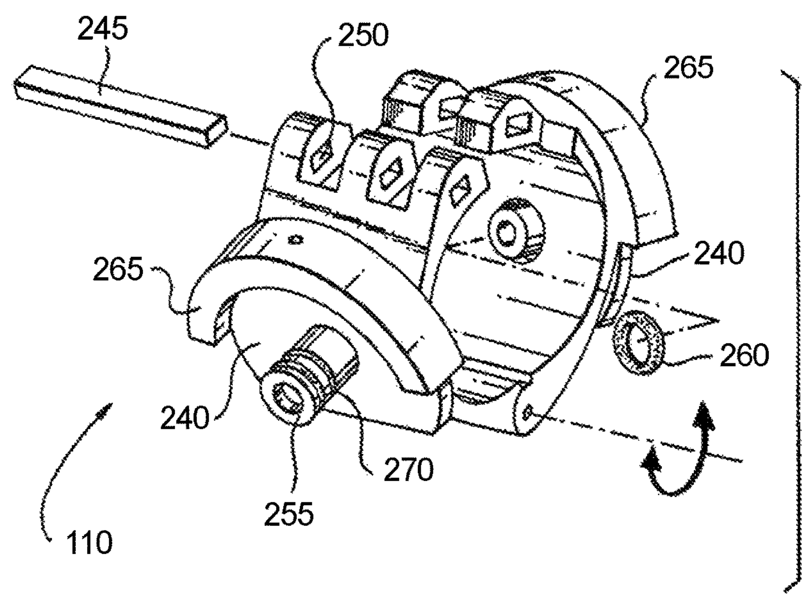
FIG. 13 shows an exploded perspective view of the FIG. 12 connection saddle.
Figure 14:
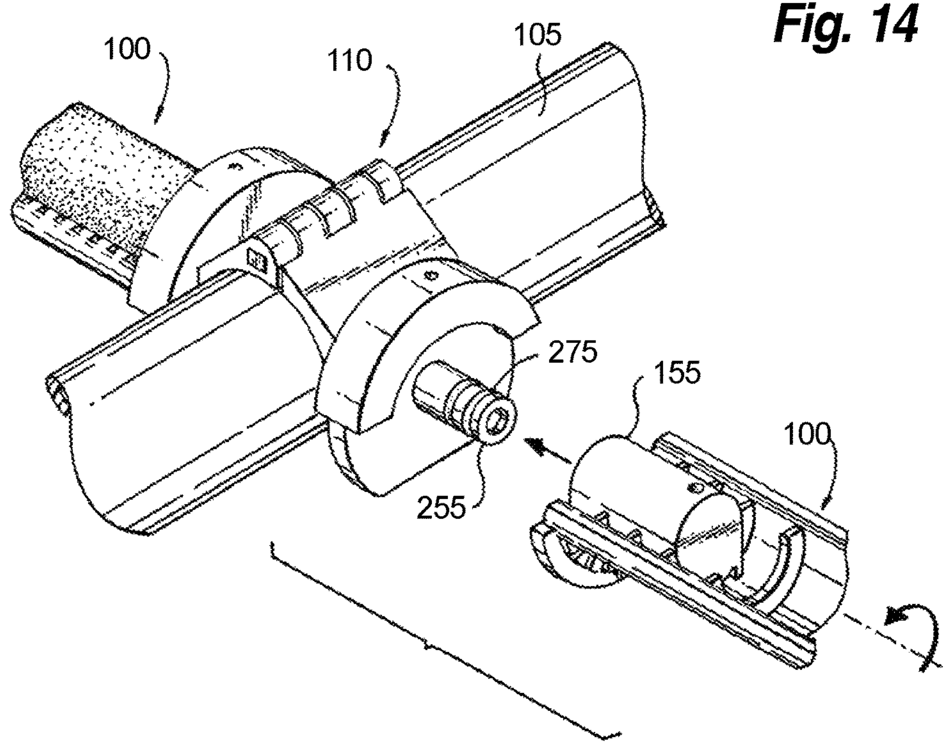
FIG. 14 shows an exploded perspective view of the FIG. 12 elements.
Figure 15:
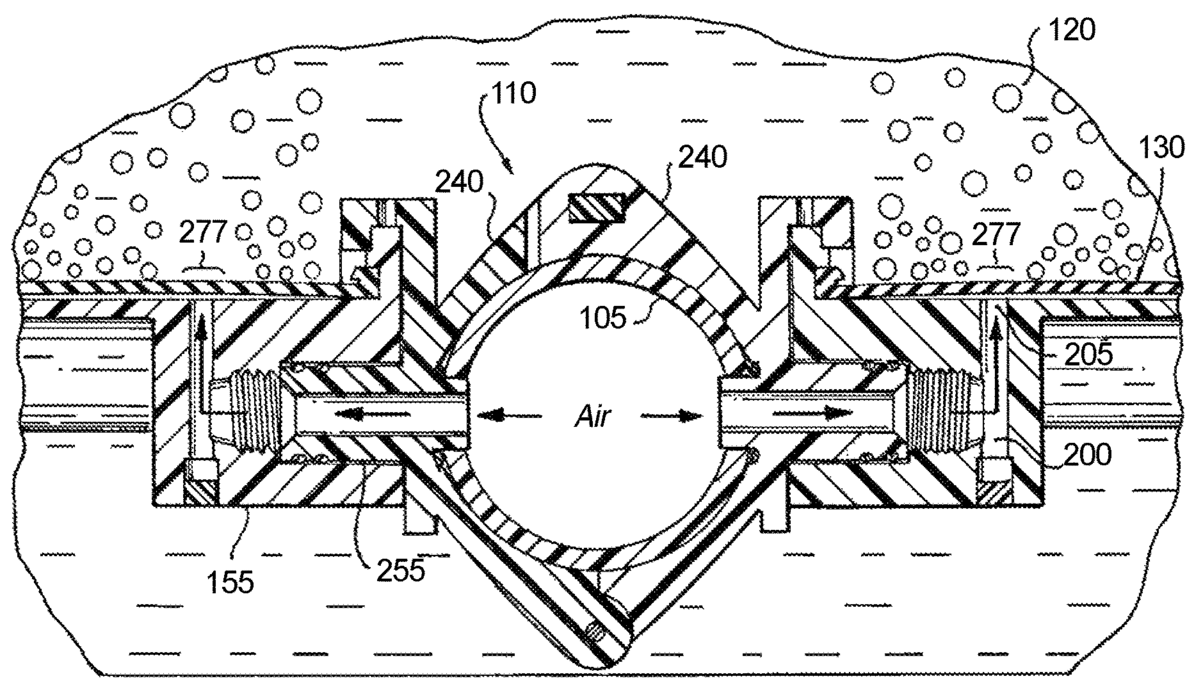
FIG. 15 shows a sectional view of the FIG. 12 elements.

Once so formed, diffuser assemblies in accordance with aspects of the invention may be attached to a gas distribution pipe in several different ways. FIGS. 12-15 describe the use of the connections saddle 110 to make the connections. FIG. 12 shows a perspective view of two diffuser assemblies 100, the connection saddle 110, and the gas distribution pipe 105 while in use, and FIG. 13 shows an exploded perspective view of the connection saddle 110 itself. FIG. 14 shows an exploded perspective view of the elements in FIG. 12, and FIG. 15 shows a sectional view of the elements in FIG. 12 along the cleave plane in FIG. 12.

The connection saddle 110 is a clamshell device with two hinged halves 240 that come together around the gas distribution pipe 105. Once closed about the air-supply pipe, the two halves 240 are fixed together by a wedge 245 that passes through passages 250 in each of the halves (FIG. 13). Two connection nipples 255, one on each half of the connection saddle 110, penetrate opposed openings in the gas distribution pipe 105. Rubber o-rings 260 assure a gastight seal between the connection nipples 255 and these openings.

Each half 240 of the connection saddle 110 also defines are an arc-shaped receiving volume 265 that is sized to receive the arc-shaped tabs 160 on each of the diffuser assemblies 100. Connecting one of the diffuser assemblies 100 to the connection saddle 110 is therefore as easy as inserting one of the connection nipples 255 into the receiving portion 155 of the diffuser assembly 100 with the arc-shaped tab 160 facing away from the arc-shaped receiving volume 265, and then rotating the diffuser assembly 180-degrees so that the arc-shaped tab 160 seats inside the arc-shaped receiving volume 265 (FIG. 14). Two additional o-rings 275 on each of the connection nipples 255 assures an airtight seal between the connection nipples 255 and the hollow-cylindrical straight-walled sub-portion 190 inside the receiving portion 155 of the diffuser assembly 100. Pressurized air provided by the gas distribution pipe 105 thereby is able to pass through the connection nipples 255, into the receiving portions 155 of the diffuser assemblies 100, and ultimately up the internal vertical tubes 200.

Referring to FIG. 15, the gas from the opening 205 expands the flexible diffuser membrane 130 away from the diffuser body 125 and causes the gas to discharge from the perforations 140 of the flexible diffuser membrane 130 as fine bubbles. If desired, an intact region 277 of the flexible diffuser membrane 130, which is devoid of perforations 140, may sit above the opening 205 created by the internal vertical tube 200 in the diffuser body 125. This intact region 277 allows the diffuser assembly 100 to act as a check valve and to prevent wastewater 120 from flooding the diffuser assembly 100 and the gas distribution pipe 105 when the pressurized gas is shut off. When the gas pressure is shut off, the flexible diffuser membrane 130 collapses back onto the diffuser body 125 both in response to the natural tendency of the flexible diffuser membrane 130 to return to a relaxed, un-stretched shape and in response to the weight of the surrounding wastewater 120. So relaxed, the intact region 277 of the flexible diffuser membrane 130 overlies the opening 205 and prevents wastewater 120 from entering the internal vertical tube 200 in the opposite direction.

The above-described diffuser assembly 100 thereby becomes a one-piece, "solid-state" diffuser assembly, meaning that it does not utilize other elements (e.g., clamps) to attach the flexible diffuser membrane 130 to the diffuser body 125. As such, the diffuser assembly 100, and, more generally, diffuser assemblies falling within the scope of the invention, may provide several advantages over conventional technologies. For example, the diffuser assembly 100 may be utilized in the field as a disposable part. When the flexible diffuser membrane 130 ultimately becomes fouled, the entire diffuser assembly 100 may be replaced by a new one. Such a replacement is a simple operation, requiring only one new part, and, with that single part, the chance of leaks is substantially reduced. The fact that the diffuser body 125 and the flexible diffuser membrane 130 only describe portions of cylinders rather than complete cylinders in the manor of conventional tube diffusers also saves on materials and weight.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Figure 16:
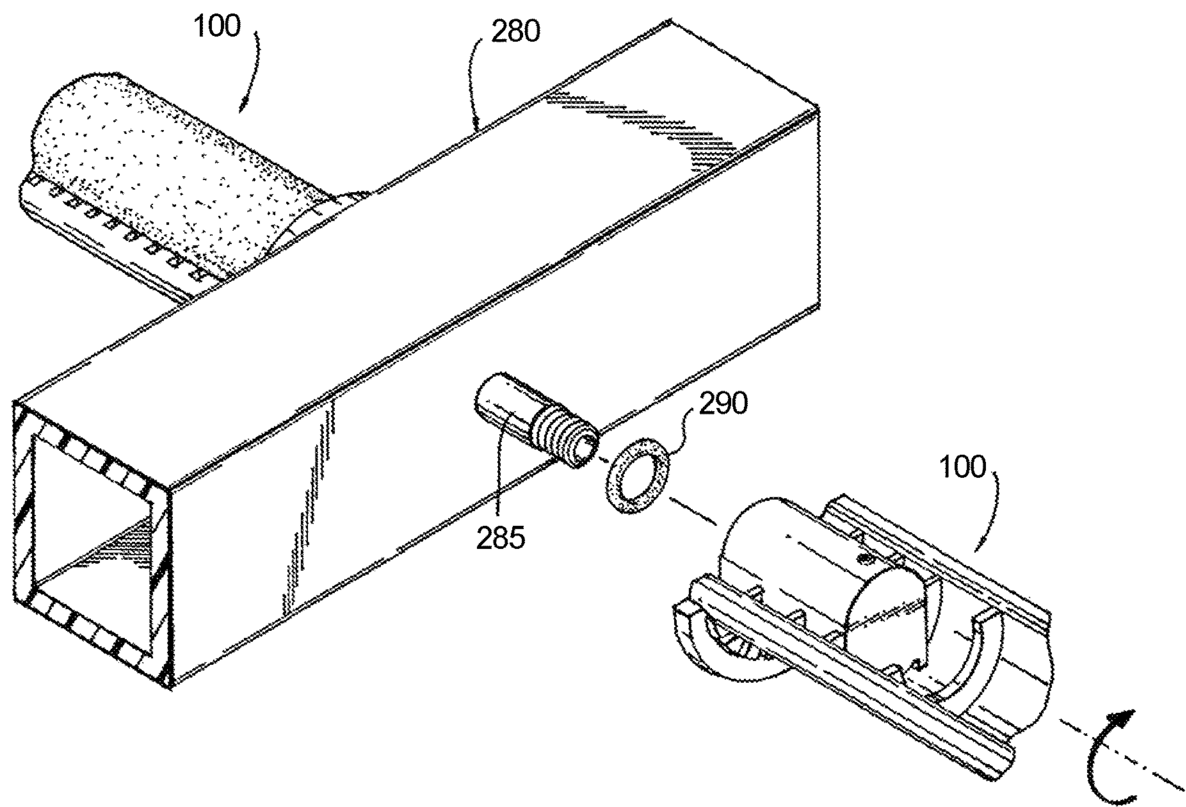
FIG. 16 shows an exploded perspective view of the FIG. 1 diffuser assemblies in association with a square gas distribution pipe.

For example, while a connection saddle like the connection saddle 110 is a convenient means by which to attach diffuser assemblies in accordance with aspects of the invention to gas distribution pipes, alternative means are contemplated and would also come within the scope of the invention. For example, FIG. 16 shows an exploded perspective view of diffuser assemblies 100 in association with a square gas distribution pipe 280. The square gas distribution pipe 280 defines a pair of threaded nipples 285. Once inserted into the receiving portions 155 of the diffuser assemblies 100, these threaded nipples 285 are able to threadably engage the hollow-cylindrical internally-threaded sub-portions 195 by rotating the diffuser assemblies 100. O-rings 290 ensure an airtight seal.

Typically a conventional flexible tube diffuser membrane is somewhat loose when applied to its underlying support tube. This looseness makes installation less difficult, improves the uniformity of the air distribution through the flexible diffuser membrane (particularly when air flow rates are low), and reduces the pressure drop associated with inflating and penetrating the flexible diffuser membrane (i.e., head loss). However, this looseness also frequently negatively impacts the useful lifetime of a flexible diffuser membrane. A common failure mechanism for flexible diffuser membranes in conventional tube diffusers is “flexure failures” or “destructive folding,” wherein buoyancy, wastewater velocity, and/or debris combine with the relatively loose fit of the flexible diffuser membrane to cause the flexible diffuser membrane to fold on itself (i.e., pinch) when the supply of pressurized air is turned off. With frequent on/off cycling of the pressurized air, as is common in, for example, Sequencing Batch Reactors (SBRs), this repeated folding ultimately causes the flexible diffuser membrane to tear.

Figure 17:
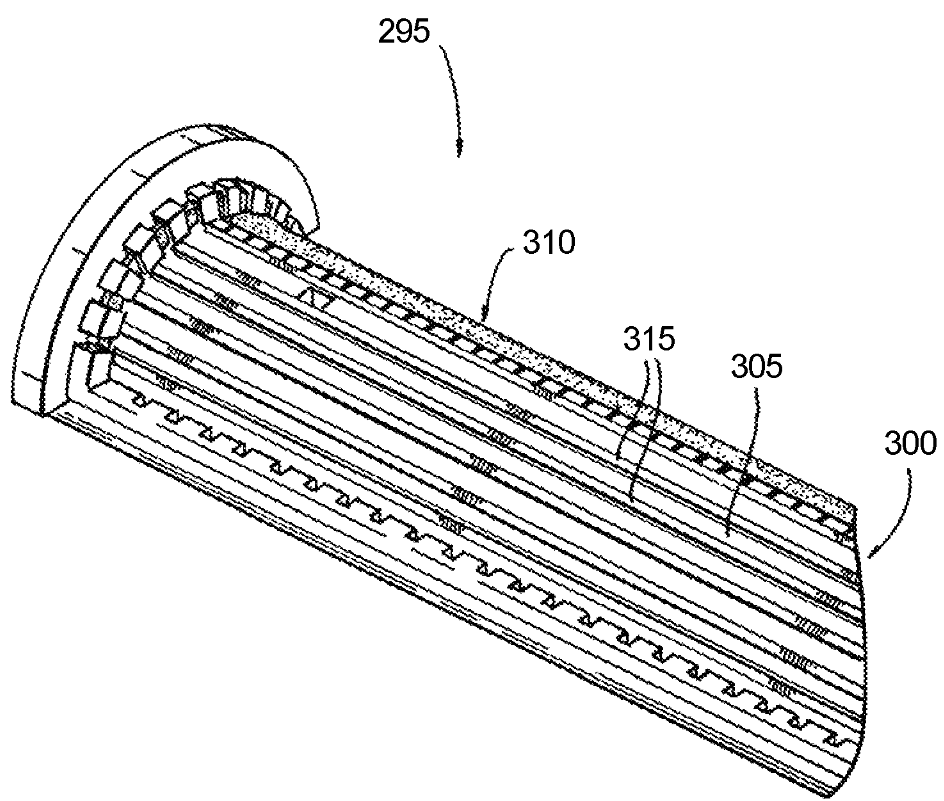
FIG. 17 shows a partially broken perspective view of a portion of a first alternative diffuser assembly in accordance with an alternative illustrative embodiment of the invention.

FIG. 17 shows a partially broken perspective view of a portion of a first alternative diffuser assembly 295 in accordance with an alternative illustrative embodiment of the invention that addresses concerns about flexure failures. The first alternative diffuser assembly 295 includes many of the elements of the diffuser assembly 100, including a diffuser body 300 with an arc-shaped underlying body portion 305 that underlies a flexible diffuser membrane 310. However, instead of having a relatively smooth surface in the manner of the arc-shaped underlying body portion 145, the arc-shaped underlying body portion 305 in the first alternative diffuser assembly 295 defines a set of ridges 315 (or ripples) that underlie the flexible diffuser membrane 310. These ridges 315 prevent the flexible diffuser membrane 310 from bunching up or pinching off, particularly when the supply of pressurized air to the first alternative diffuser assembly 295 is shut off. That is, the ridges 315 supply the flexible diffuser membrane 310 with a large, gently-shaped surface area onto which to relax when the pressurized gas is turned off. Flexure failures of the type described above are thereby avoided.

Figure 18:
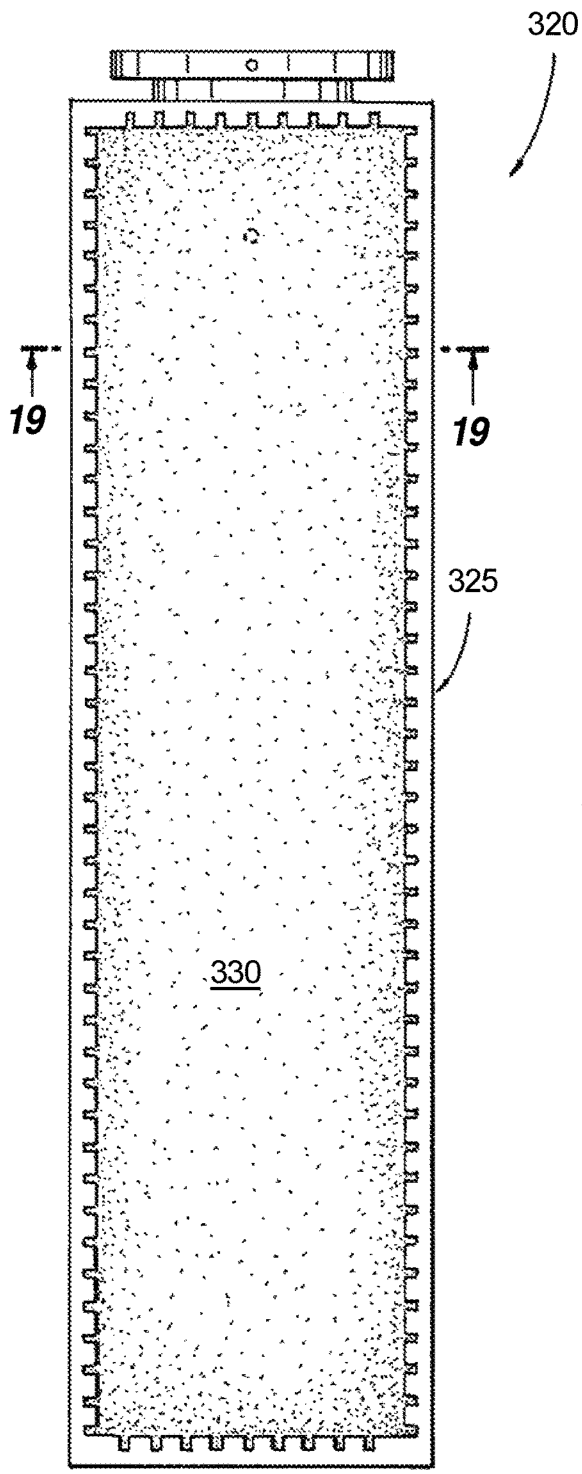
FIGS. 18 and 19 show a plan view and a distal end elevational view, respectively, of a second alternative diffuser assembly in accordance with another alternative embodiment of the invention.
Figure 19:
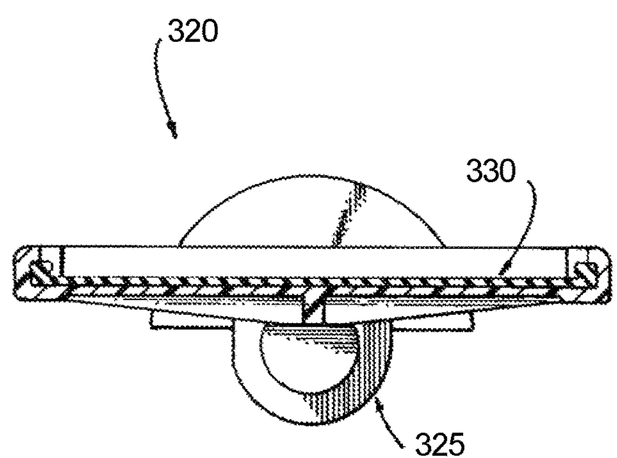

Finally, FIGS. 18 and 19 show aspects of a second alternative diffuser assembly 320 in accordance with a second alternative embodiment of the invention. FIG. 19 shows a plan view while FIG. 20 shows a distal end elevational view. The second alternative diffuser assembly 320 includes a diffuser body 325 with a perimeter edge frame along four edges, and a flexible diffuser membrane 330 with a perimeter edge bead along four edges. However, unlike the diffuser assembly 100, the diffuser body 325 underlying the flexible diffuser membrane 330 is flat. Otherwise, the second alternative diffuser assembly 320 functions in a manner similar to the diffuser assembly 100, and may be formed by injection molding in a comparable manner.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state “means for” performing a specified function or “step for” performing a specified function is not to be interpreted as a “means for” or “step for” clause as specified in AIA 35 U.S.C. § 112(f). In particular, the use of “step of” in the claims herein is not intended to invoke the provisions of AIA 35 U.S.C. § 112(f).

What is claimed is:

1. A diffuser assembly comprising:

a flexible diffuser membrane defining a perimeter edge bead along four edges; and a diffuser body defining an underlying body portion underlying the flexible diffuser membrane, and a perimeter edge frame covering a covered portion of the perimeter edge bead;

wherein the perimeter edge frame defines an inside surface that conforms to an outside shape of the covered portion of the perimeter edge bead;

wherein the perimeter edge frame is integral to the underlying body portion;

wherein the underlying body portion describes an arc shape;

wherein the flexible diffuser membrane conforms to the arc shape of the underlying body portion when the diffuser assembly is not in use;

wherein the perimeter edge bead projects away from the underlying body portion.

2. The diffuser assembly of claim 1, wherein the flexible diffuser membrane comprises an elastomer.

3. The diffuser assembly of claim 1, wherein the flexible diffuser membrane is rectangular in a plan view.

4. The diffuser assembly of claim 1, wherein the flexible diffuser membrane defines a plurality of perforations therethrough.

5. The diffuser assembly of claim 1, wherein the perimeter edge bead is not substantially compressed by the diffuser body.

6. The diffuser assembly of claim 1, wherein the diffuser body comprises a thermoplastic.

7. The diffuser assembly of claim 1, wherein the diffuser body defines an opening underlying the flexible diffuser membrane.

8. The diffuser assembly of claim 7, wherein the diffuser body defines a hollow-cylindrical straight-walled portion in gaseous communication with the opening.

9. The diffuser assembly of claim 7, wherein the diffuser body defines a hollow-cylindrical internally-threaded portion in gaseous communication with the opening.

10. The diffuser assembly of claim 1, wherein the arc shape of the underlying body portion has a curvature transverse to a longitudinal axis of the underlying body portion.

11. The diffuser assembly of claim 1, wherein the perimeter edge frame defines a plurality of slots therein, each of the plurality of slots exposing a respective outside surface portion of the perimeter edge bead.

12. The diffuser assembly of claim 1, wherein the covered portion of the perimeter edge bead consists of a majority of the perimeter edge bead.

13. A wastewater treatment system comprising:

a wastewater treatment tank defining a bottom;

a gas distribution pipe supported over the bottom; and a diffuser assembly in gaseous communication with an inside of the gas distribution pipe and comprising:

a flexible diffuser membrane defining a perimeter edge bead along four edges; and a diffuser body defining an underlying body portion underlying the flexible diffuser membrane, and a perimeter edge frame covering a covered portion of the perimeter edge bead;

wherein the perimeter edge frame defines an inside surface that conforms to an outside shape of the covered portion of the perimeter edge bead;

wherein the perimeter edge frame is integral to the underlying body portion;

wherein the underlying body portion describes an arc shape;

wherein the flexible diffuser membrane conforms to the arc shape of the underlying body portion when the diffuser assembly is not in use;

wherein the perimeter edge bead projects away from the underlying body portion.

14. The wastewater treatment system of claim 13, further comprising:

a connection saddle comprising two hinged halves and a nipple;

wherein the nipple provides the gaseous communication between the inside of the gas distribution pipe and the diffuser assembly.

15. A method for forming a diffuser assembly comprising the steps of:

receiving a flexible diffuser membrane defining a perimeter edge bead along four edges; and forming at least in part by injection molding a diffuser body defining an underlying body portion underlying the flexible diffuser membrane, and a perimeter edge frame covering a covered portion of the perimeter edge bead;

wherein the perimeter edge frame defines an inside surface that conforms to the covered portion of the perimeter edge bead;

wherein the perimeter edge frame is integral to the underlying body portion;

wherein, during injection molding, molten plastic directly contacts the covered portion of the perimeter edge bead.

16. The method of claim 15, wherein the perimeter edge bead is supported by a plurality of supporting teeth during the injection molding.

17. The method of claim 16, wherein:

the perimeter edge frame defines a plurality of slots therein, each of the plurality of slots exposing a respective outside surface portion of the perimeter edge bead; and each of the plurality of slots is positioned where a respective one of the plurality of supporting teeth was located during the injection molding.

* * * * *